US012689596B2

(12) United States Patent
Eaton

(10) Patent No.: US 12,689,596 B2
(45) Date of Patent: Jul. 21, 2026

(54) METHODS AND SYSTEMS FOR REGULATING NETWORK CONNECTIVITY FROM A GATEWAY

(71) Applicant: DISH Network L.L.C., Englewood, CO (US)

(72) Inventor: Zane C. Eaton, Pompano Beach, FL (US)

(73) Assignee: DISH Network L.L.C., Englewood, CO (US)

( * ) Notice: Subject to any disclaimer, the term of this patent is extended or adjusted under 35 U.S.C. 154(b) by 0 days.

(21) Appl. No.: 18/757,123

(22) Filed: Jun. 27, 2024

(65) Prior Publication Data

US 2024/0348560 A1      Oct. 17, 2024

Related U.S. Application Data

(63) Continuation of application No. 18/181,025, filed on Mar. 9, 2023, now Pat. No. 12,040,994.

(60) Provisional application No. 63/323,027, filed on Mar. 23, 2022.

(51) Int. Cl.
H04L 47/70              (2022.01)
(52) U.S. Cl.
CPC .......... H04L 47/822 (2013.01); H04L 47/821 (2013.01)
(58) Field of Classification Search
CPC ........................... H04L 47/822; H04L 47/821
See application file for complete search history.

(56) References Cited

U.S. PATENT DOCUMENTS

| | | | | |
|---|---|---|---|---|
| 9,479,807 | B1 * | 10/2016 | Bugajski | ............ H04N 21/6582 |
| 10,637,782 | B2 * | 4/2020 | Dillon | ..................... H04L 47/24 |
| 10,993,147 | B1 * | 4/2021 | Bantoft | ................. H04W 28/24 |
| 11,582,769 | B2 * | 2/2023 | Munirathinam | .... H04L 41/5022 |
| 11,818,054 | B2 * | 11/2023 | Eaton | ..................... H04L 47/785 |
| 2008/0049753 | A1 | 2/2008 | Heinze et al. | |
| 2012/0216259 | A1 | 8/2012 | Okamoto et al. | |
| 2016/0006500 | A1 * | 1/2016 | Radpour | ............ H04B 7/18539 |
| | | | | 455/427 |
| 2018/0183684 | A1 * | 6/2018 | Jacobson | .............. H04L 41/145 |
| 2018/0302907 | A1 * | 10/2018 | Niina | ..................... H04W 72/56 |
| 2019/0044882 | A1 * | 2/2019 | Poorchandran | ......... H04L 47/80 |
| 2019/0110223 | A1 | 4/2019 | Nekoui et al. | |
| 2021/0092035 | A1 * | 3/2021 | Williams | ................ H04L 47/22 |
| 2023/0308399 | A1 | 9/2023 | Eaton | |

* cited by examiner

*Primary Examiner* — Kristie D Shingles
(74) *Attorney, Agent, or Firm* — Perkins Coie LLP

(57) ABSTRACT

The present disclosure is directed to methods and systems for distributing network connectivity from a gateway. The network access system can include a gateway with the ability to support regulating network access to various devices. The network access functionality can be configurable and customizable to various users or devices. The gateway can connect to a source and determine the bandwidth. Using the determined bandwidth, the gateway can allocate the bandwidth among the devices according to a priority order of the devices. In some implementations, the gateway can receive customizable features from the user for bandwidth allocation to devices connected the gateway. The gateway can track the network usage by MAC address of a device and disconnect the device from the network when the network usage reaches a threshold.

20 Claims, 6 Drawing Sheets

400

METHODS AND SYSTEMS FOR REGULATING NETWORK CONNECTIVITY FROM A GATEWAY

CROSS-REFERENCE TO RELATED APPLICATIONS

This application is a continuation of U.S. patent application Ser. No. 18/181,025, filed Mar. 9, 2023, which claims the benefit of U.S. Provisional Patent Application No. 63/323,027, filed Mar. 23, 2022, which are incorporated by reference in its entirety.

BACKGROUND

A user can pay for an internet network provided by an internet service provider (ISP). However, often the user does not utilize the full capability of the internet that they receive. In some cases, a user can share access to the internet network by giving other users the access credentials to the network.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Aspects of the present disclosure are directed to methods and systems for regulating network connectivity from a gateway. The network access system can include a gateway (e.g., a router, such as a 5G router) with the ability to support regulating network access to various devices. The network access functionality can be configurable and customizable to various users or devices. The gateway can connect to a source (e.g., internet service provider (ISP), cable networks, OTA networks, satellite networks, etc.) and determine the bandwidth. Using the determined bandwidth, the gateway can allocate the bandwidth among the devices according to a priority order of the devices. For example, a first device has a higher bandwidth priority than a second device.

In some implementations, the gateway can receive customizable features from the user for bandwidth allocation to devices connected the gateway. Examples of the customizable features can include security options, parental controls, operational hours, MAC address specific operations, MAC address usage, number of user limits, and internet usage tracking. For example, a parent can define the time and duration a device of their child can connect to the network. The gateway can track the network usage (e.g., bandwidth usage or network usage duration) by MAC address of a device. When the network usage reaches a threshold, the gateway can send a notification to the device and/or disconnect the device from the network. In some implementations, the gateway determines the bandwidth allocation priority of the device based on the customizable features.

Methods and systems disclosed herein can provide technical advantages over conventional gateway systems. For example, the disclosed network access gateway system provides: 1) the ability to support regulating network access to multiple devices; 2) the ability to allocate bandwidth among the multiple devices; 3) the ability to track network usage of a device; and 4) the ability to dynamically adjust the bandwidth based on a priority order of the devices and/or customizable features.

Figure 1:
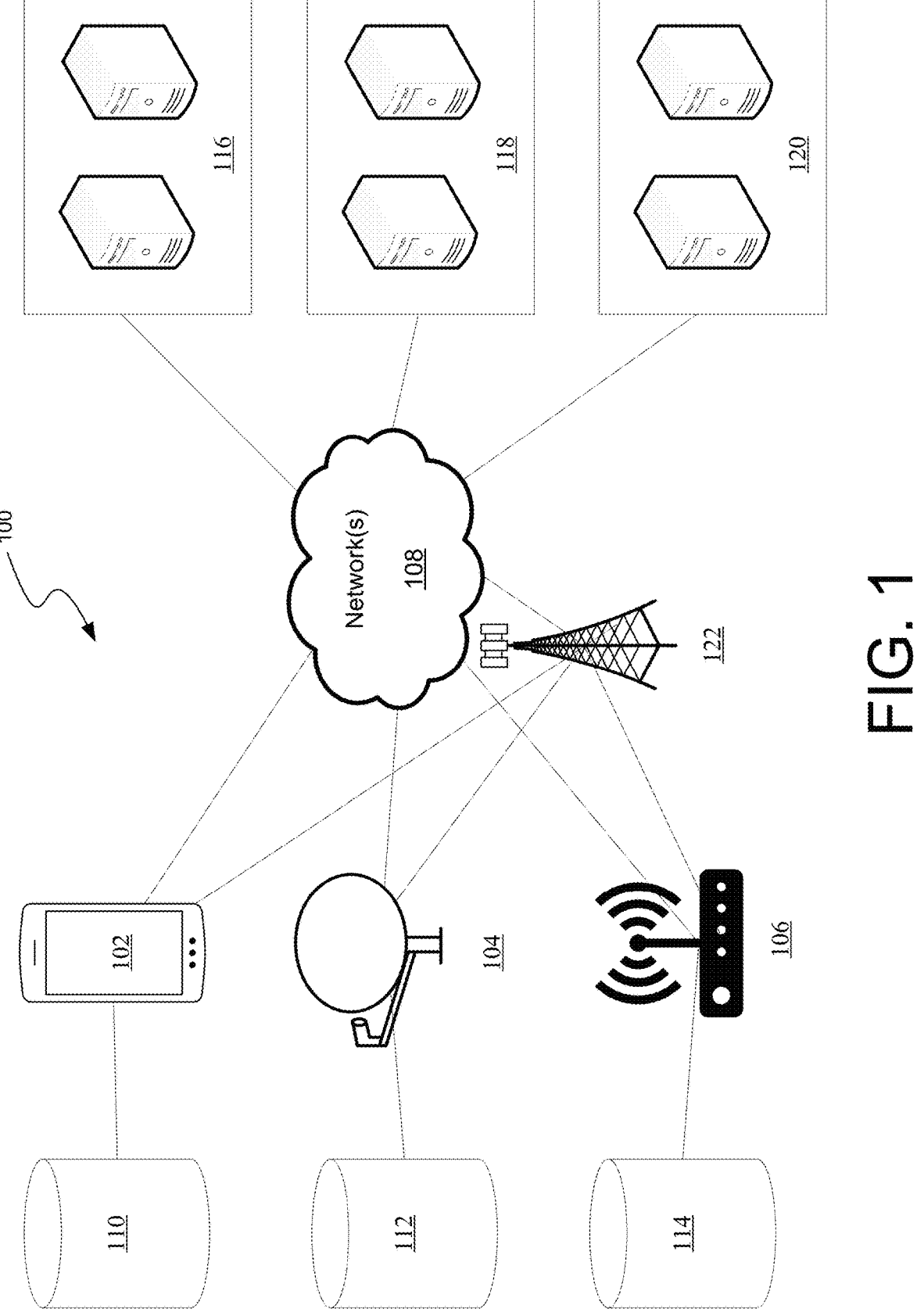
FIG. 1 illustrates an example of a distributed system for regulating network connectivity from a gateway.

FIG. 1 illustrates an example of a distributed system for regulating network connectivity from a gateway. Example system 100 presented is a combination of interdependent components that interact to form an integrated whole for regulating network connectivity from a gateway. Components of the systems may be hardware components or software implemented on, and/or executed by, hardware components of the systems. For example, system 100 comprises client devices 102, 104, and 106, local databases 110, 112, and 114, network(s) 108, and server devices 116, 118, and/or 120.

Client devices 102, 104, and 106 may be configured to regulate network access from a gateway. In one example, a client device 102 may be a mobile phone, a client device 104 may be a smart OTA antenna, and a client device 106 may be a broadcast module box (e.g., set-top box). In other example aspects, client device 106 may be a gateway device (e.g., router) that is in communication with sources, such as ISPs, cable networks, or satellite networks. Other possible client devices include but are not limited to tablets, personal computers, televisions, etc. In aspects, a client device, such as client devices 102, 104, and 106, may have access to one or more networks from a gateway. In other aspects, client devices 102, 104, and 106, may be equipped to receive data from a gateway. The signals that client devices 102, 104, and 106 may receive may be transmitted from satellite broadcast tower 122. Broadcast tower 122 may also be configured to communicate with network(s) 108, in addition to being able to communicate directly with client devices 102, 104, and 106. In some examples, a client device may be a set-top box that is connected to a display device, such as a television (or a television that may have set-top box circuitry built into the television mainframe).

Client devices 102, 104, and 106 may be configured to run software that determines a prioritized order of the devices on the network, receives customizable features for the devices, and allocates bandwidth among the devices according to the prioritized order of the devices or the customizable features for each device. Client devices 102, 104, and 106 may access content data through the network. The content data may be stored locally on the client device or run remotely via network(s) 108. For example, a client device may receive a signal from broadcast tower 122 containing content data. The signal may indicate user requested media content. The client device may receive this user requested content data and subsequently store this data locally in databases 110, 112, and/or 114. In alternative scenarios, the user requested content data may be transmitted from a client device (e.g., client device 102, 104, and/or 106) via network(s) 108 to be stored remotely on server(s) 116, 118, and/or 120. A user may subsequently access the media content data from a local database (110, 112, and/or 114) and/or external database (116, 118, and/or 120), depending on where the media content data may be stored. The system may be configured to receive and process user requested content data in the background.

In some example aspects, client devices 102, 104, and/or 106 may be equipped to receive signals from an input device. Signals may be received on client devices 102, 104, and/or 106 via Bluetooth, Wi-Fi, infrared, light signals, binary, among other mediums and protocols for transmitting/receiving signals. For example, a user may use a mobile device 102 to check for the content data from a channel from an OTA antenna (e.g., antenna 104). A graphical user interface may display on the mobile device 102 the requested content data. Specifically, at a particular geolocation, the antenna 104 may receive signals from broadcast tower 122. The antenna 104 may then transmit those signals for analysis via network(s) 108. The results of the analysis may then be displayed on mobile device 102 via network(s) 108. In other examples, the results of the analysis may be displayed on a television device connected to a broadcast module box, such as broadcast module box 106.

In other examples, databases stored on remote servers 116, 118, and 120 may be utilized to assist the system in providing content to a user from a gateway regulating network access. Such databases may contain certain content data such as video titles, actors in movies, video genres, etc. Such data may be transmitted via network(s) 108 to client devices 102, 104, and/or 106 to assist in identifying user requested media content. Because broadcast tower 122 and network(s) 108 are configured to communicate with one another, the systems and methods described herein may be able to identify requested media content in different sources, such as streaming services, local and cloud storage, cable, satellite, or OTA.

Figure 2:
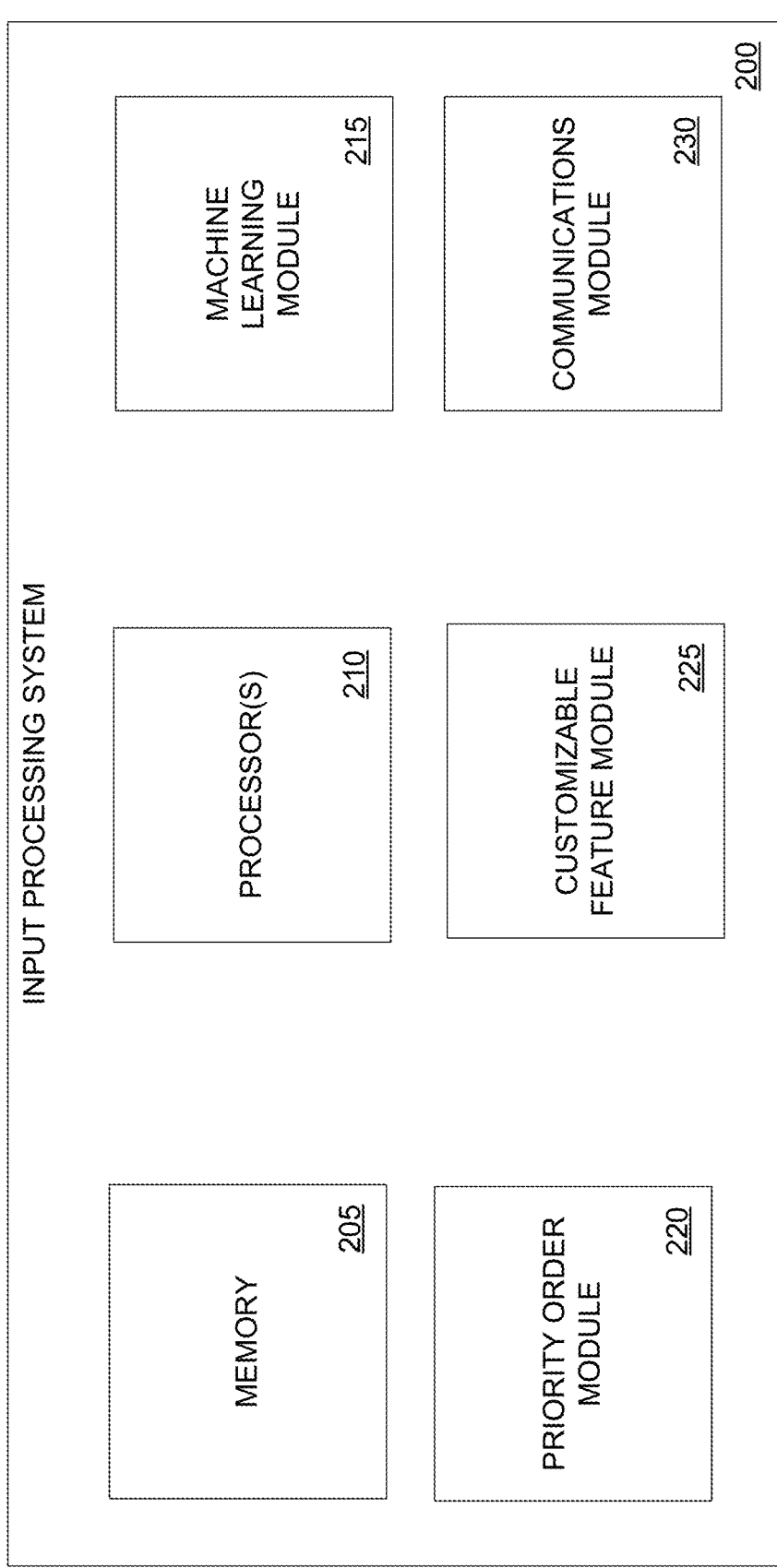
FIG. 2 illustrates an example input processing system for implementing systems and methods for regulating network connectivity from a gateway.

FIG. 2 illustrates an example input processing system for implementing systems and methods for regulating network connectivity from a gateway. The input processing system (e.g., one or more data processors) is capable of executing algorithms, software routines, and/or instructions based on processing data provided by a variety of sources related to determining a prioritized order of networks and allocating bandwidth to the networks according to the prioritized order. The input processing system can be a general-purpose computer or a dedicated, special-purpose computer. According to the embodiments shown in FIG. 2, the disclosed system can include memory 205, one or more processors 210, machine learning module 215, priority order module 220, customizable feature module 225, and communications module 230. Other embodiments of the present technology may include some, all, or none of these modules and components, along with other modules, applications, data, and/or components. Still yet, some embodiments may incorporate two or more of these modules and components into a single module and/or associate a portion of the functionality of one or more of these modules with a different module.

Memory 205 can store instructions for running one or more applications or modules on processor(s) 210. For example, memory 205 could be used in one or more embodiments to house all or some of the instructions needed to execute the functionality of machine learning module 215, priority order module 220, customizable feature module 225, and communications module 230. Generally, memory 205 can include any device, mechanism, or populated data structure used for storing information. In accordance with some embodiments of the present disclosures, memory 205 can encompass, but is not limited to, any type of volatile memory, nonvolatile memory, and dynamic memory. For example, memory 205 can be random access memory, memory storage devices, optical memory devices, magnetic media, floppy disks, magnetic tapes, hard drives, SIMMs, SDRAM, RDRAM, DDR, RAM, SODIMMs, EPROMs, EEPROMs, compact discs, DVDs, and/or the like. In accordance with some embodiments, memory 205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information that can be used as memory 205. In some example aspects, memory 205 may store at least one database containing the customizable features of the devices, a prioritized order of the devices, or user requested content information, such as audio or video data.

Machine learning module 215 may be configured to analyze gateway settings to determine a bandwidth allocation setting (e.g., prioritized order of bandwidth allocation) of the devices for bandwidth allocation. The machine learning module 215 may be configured to determine a bandwidth allocation setting based on at least one machine-learning algorithm trained on at least one dataset reflecting a user selected bandwidth allocation setting of devices. The at least one machine-learning algorithms (and models) may be stored locally at databases and/or externally at databases (e.g., cloud databases and/or cloud servers). Client devices may be equipped to access these machine learning algorithms and intelligently identify user preferences, such as the customizable features, and determine a bandwidth allocation setting such as a prioritized order of the devices for bandwidth allocation based on at least one machine-learning model that is trained on a user's historical device bandwidth allocation setting history. For example, if a user frequently prioritizes device A over device B, the user's priority history may be collected to train a machine-learning model to automatically prioritize device A over device B, or over a new device connecting to the gateway.

As described herein, a machine-learning (ML) model may refer to a predictive or statistical utility or program that may be used to determine a probability distribution over one or more character sequences, classes, objects, result sets or events, and/or to predict a response value from one or more predictors. A model may be based on, or incorporate, one or more rule sets, machine learning, a neural network, or the like. In examples, the ML models may be located on the client device, service device, a network appliance (e.g., a firewall, a router, etc.), or some combination thereof. The ML models may process user priority history and other data stores of user preferences (e.g., surveys, user profile settings, etc.) to determine the priority order of the device connected to a gateway. Determining a priority order for a certain device may comprise identifying various characteristics of a user's priority history and preferences. For instance, if a user has a user profile that displays preferences of user priority (e.g., parent has higher priority than a child, an internet subscriber has a higher priority than a neighbor connecting to the gateway, or a device used for work has a higher priority than a device used for entertainment), then the system described herein may determine that certain devices be prioritized based on the content or user of the network. Based on an aggregation of data from a user's priority history, user profiles, gateway settings, network settings, MAC address, and other user data stores, at least one ML model may be trained and subsequently deployed to automatically determine a priority order of the devices for bandwidth allocation. The trained ML model may be deployed to one or more devices. As a specific example, an instance of a trained ML model may be deployed to a server device and to a client device. The ML model deployed to a server device may be configured to be used by the client device when, for example, the client device is connected to the internet. Conversely, the ML model deployed to a client device may be configured to be used by the client device when, for example, the client device is not connected to the internet. In some instances, a client device may not be connected to the internet but still configured to receive satellite signals with multimedia information and channel guides. In such examples, the ML model may be locally cached by the client device.

Priority order module 220 is configured identify devices connected to a gateway and determine a priority order of the devices for bandwidth allocation. The priority order module 220 can determine a priority order for the devices based on user preferences, user settings, or the MAC address of each device. In some implementations, the priority order is predetermined by a user, and the priority order module 220 assigns priority values to the devices based on the predetermined priority order. The system described herein can allocate bandwidth to the devices according to the priority order.

Customizable feature module 225 is configured to receive and analyze customizable features for each device connected to the gateway. Examples of the customizable features can include usage tracking per MAC address, security options, parental controls, operational hours, MAC address specific operations, number of user limits, and internet usage tracking. The customizable feature module 225 can rank the devices based on the customizable feature settings. For example, a device with fewer settings receives a lower ranking than a device with more settings. Priority order module 220 can use the customizable feature settings from customizable feature module 225 to determine a priority order of the devices.

Communications module 230 is associated with sending/receiving information (e.g., priority order information from machine learning module 215, priority order module 220, and customizable feature module 225) with a remote server or with one or more client devices, streaming devices, routers, OTA boxes, set-top boxes, etc. These communications can employ any suitable type of technology, such as Bluetooth, WiFi, WiMax, cellular, single hop communication, multi-hop communication, Dedicated Short Range Communications (DSRC), or a proprietary communication protocol. In some embodiments, communications module 230 sends priority order information identified by the priority order module 220 and information identified by the customizable feature module 225. Furthermore, communications module 230 may be configured to communicate content data to a client device and/or OTA box, smart OTA antenna, and/or smart TV, etc.

Figure 3:
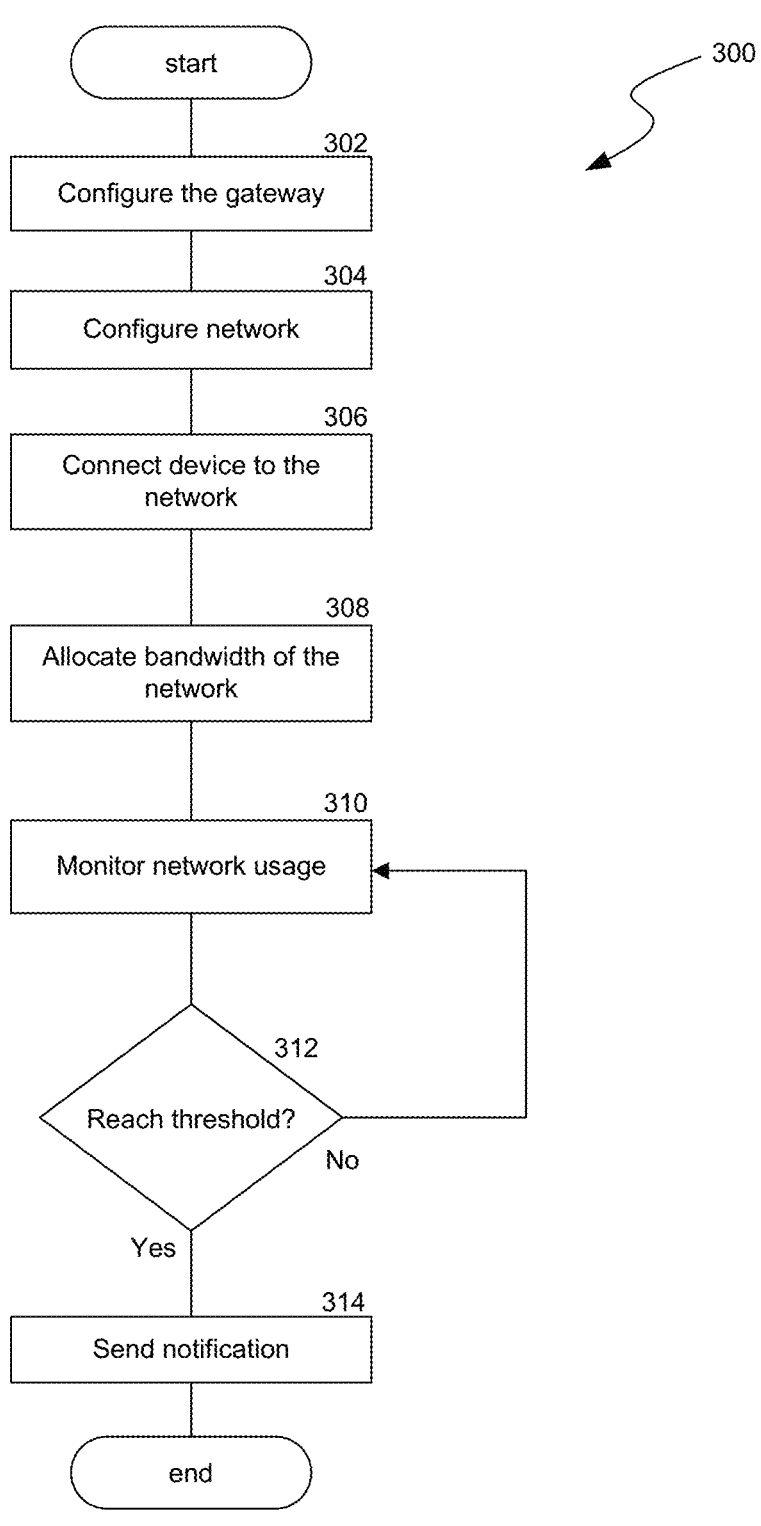
FIG. 3 is a flow diagram illustrating a process used in some implementations for regulating network connectivity from a gateway.

FIG. 3 is a flow diagram illustrating a process 300 used in some implementations for regulating network connectivity from a gateway. In some implementations, process 300 is triggered by a user activating a subscription for network connectivity, powering on a device, a device connecting to a gateway (e.g., router), powering on the gateway, the gateway connecting to a source (e.g., ISP, cable network, satellite network, etc.), or the user downloading an application on a device for network connectivity. In various implementations, process 300 is performed locally on the user device or performed by cloud-based device(s) that can regulate network connectivity from a gateway.

At block 302, process 300 connects a gateway to a source and configures the settings of the gateway. A user can select gateway settings on the gateway device, such as on a user interface screen or buttons on the gateway device, or the user can input settings in an application on a user device, such as a smart phone or tablet. When registering or activating the gateway, the user can provide access information (e.g., passwords, usernames, biometrics, etc.), user preferences, security settings, parental controls, MAC address usage limits, operational hours, bandwidth usage settings, connectivity duration settings, MAC address specific operations, user limits, number of user limits, and network usage settings for devices. For example, a user can define the time of day a device can access the network, define the user credentials required to access a network, define the devices that can connect to the network, define the duration of network access for a device, define an allotment of bandwidth for the device, a priority order of bandwidth allocation for a device, define the hours of operation on a network for a device, set a limit on the amount of data that can be streamed or downloaded on the network by a device, and define the type of content than can be viewed by a device. In some implementations, a gateway setting includes requiring a fee (e.g., pay for access to the network) for a device to access the network. Based on the fee, the device can be allotted a duration of network access or allocated bandwidth of the network. In some cases, a user can adjust the network usage of a device. For example, a parent can load a child's allowance (e.g., based on good grades in school, duration of practicing a musical instrument, learning a language, etc.) into the gateway as a duration of network access or bandwidth usage.

At block 304, process 300 configures the network provided by the gateway based on the gateway settings. Process 300 can generate a priority order of the devices for allocating bandwidth based on the gateway settings. In some embodiments, the priority order of the devices is based on the users accessing the network. For example, a first user (e.g., parent, landlord, etc.) has a higher priority than a second user (e.g., a child, tenant, etc.). Process 300 can identify the users based on user credentials (e.g., usernames, passwords, pins, biometrics, etc.) or user devices. In some embodiments, the priority order of the devices is based on the frequency that the network is accessed by users. For example, if a first device accesses the network more frequently than a second device, the first device has a higher priority than the second device.

In some embodiments, the priority order of the devices is based on the time of day. For example, a first device has a higher priority than a second device in the evening from 6 PM until 9 PM, such as the device of a student has a higher priority each evening for homework than the device of a gamer connected to the network. In some embodiments, the priority order of the devices is based on the devices (e.g., MAC addresses of the device) accessing the networks. For example, a first device (e.g., laptop or tablet) has a higher priority than a second device (e.g., smartphone, smart TV, etc.). In some embodiments, the priority order of the devices is based on requests from the user(s). For example, a user can request to have their device receive top priority for bandwidth allocation.

At block 306, process 300 connects the user devices to the network provided by the gateway. The user devices can access the network according to the gateway settings of block 302, such as security settings, parental controls, operational hours, MAC address specific operations, number of
user limits, and network usage settings. In some implemen-
tations, a user of a device can view the remaining network
usage (e.g., network duration or bandwidth) they are allotted
on a user interface.

At block 308, process 300 allocates the bandwidth to the
devices according to the priority order. Process 300 can have
a priority queue of the devices. When data is received or
transmitted from the gateway, the bandwidth is allocated by
the gateway for the transmitting or receiving action accord-
ing to the priority order of the devices. At block 310, process
300 monitors the network usage of a device connected to the
network. Process 300 can track the bandwidth usage of a
device or the duration that a device is connected to the
network.

At block 312, process 300 determines whether a device
has reached the network usage threshold allotted by the
gateway settings. If the device has not reached the network
usage threshold, process 300 can continue to monitor the
bandwidth usage and duration of connectivity of the device.
When the device has reached the network usage threshold,
at block 314 process 300 sends a notification to the device.
In some implementations, process 300 monitors the network
and determines when to enforce the gateway settings for the
connected devices. In a first example, when a device reaches
its bandwidth usage allotment, process 300 sends an alert to
the user device or disconnects the user device from the
network. In a second example, when a user reaches the end
of their operational hours on the network, process 300 sends
an alert to the user device or disconnects the user device
from the network. In a third example, when the device
reaches the network usage threshold, process 300 sends the
device a notification with a renewal fee for additional access.
In some embodiments, process 300 ensures that devices of
higher priority in the priority queue, receive priority over
other devices and can deactivate/disconnect lower priority
devices when the bandwidth falls below a threshold.

Figure 4:
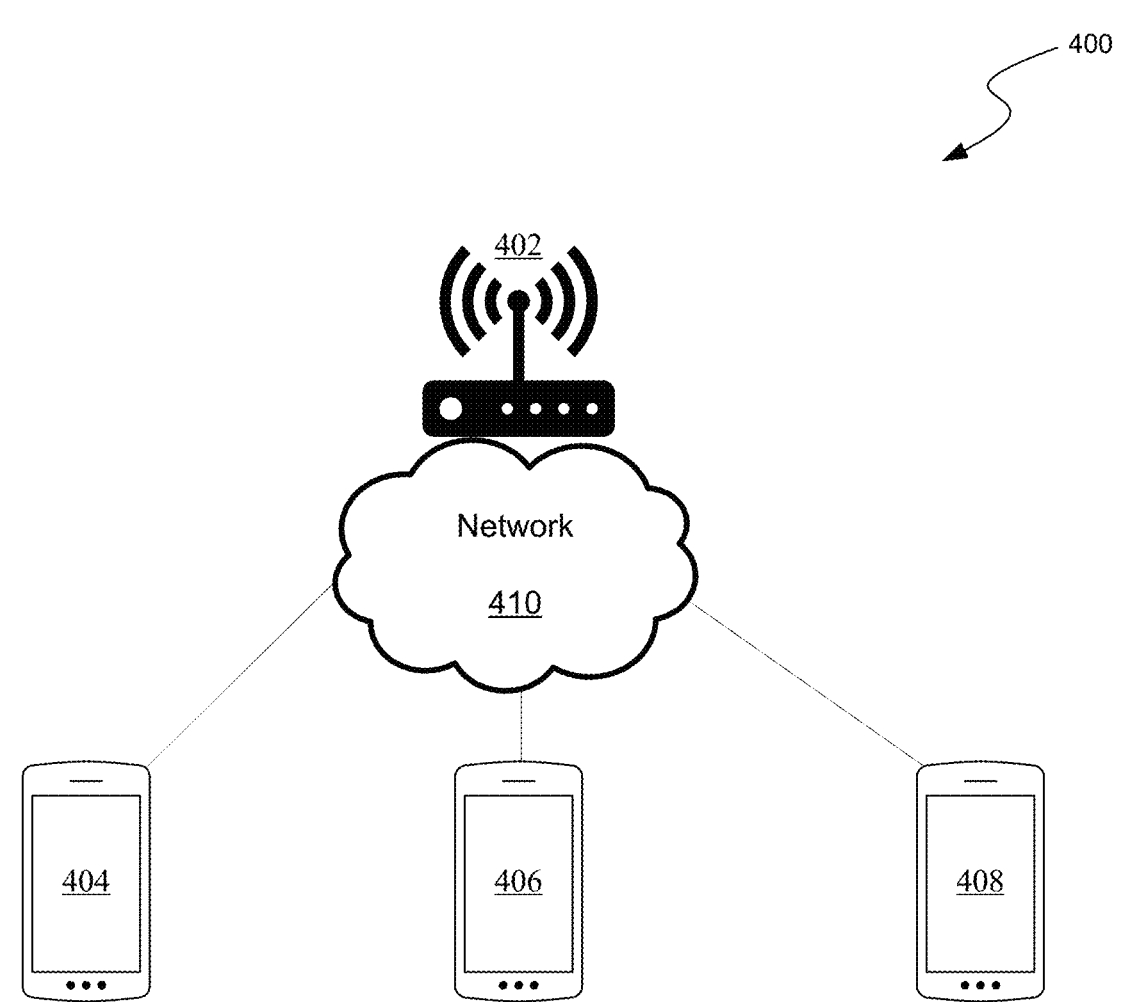
FIG. 4 illustrates an example of a gateway regulating network connectivity to multiple devices, as described herein.

FIG. 4 illustrates an example of a gateway regulating
network connectivity to multiple devices, as described
herein. In environment 400, gateway 402 (e.g., router)
provides network 410 to devices 404, 406, and 408. Gate-
way 402 can regulate the duration of access, type of access,
or bandwidth allocation to the devices 404, 406, and 408
connected to network 410.

Figure 5:
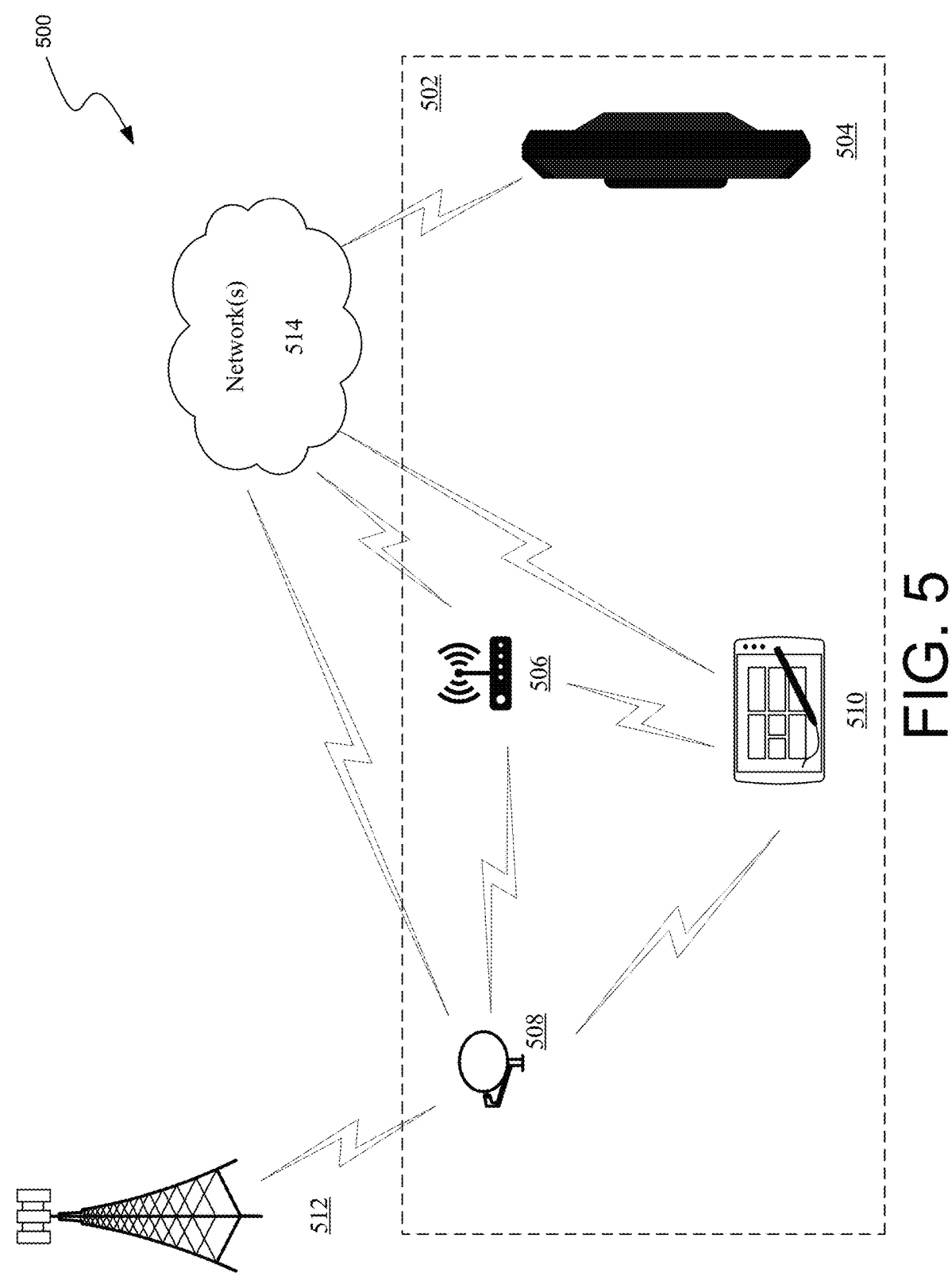
FIG. 5 illustrates an example environment of operation of the disclosed technology.

FIG. 5 illustrates an example environment of operation of
the disclosed technology. In the example environment illus-
trated in FIG. 5, area 502 may represent a house, a com-
mercial building, an apartment, a condo, or any other type of
suitable dwelling. Inside area 502 is at least one television
504, an OTA box 506 (e.g., router or broadcast module box)
an OTA antenna 508, and a mobile device 510. Each of these
devices may be configured to communicate with network(s)
514. OTA box 506 may be configured as a central gateway
communicable with various multimedia content providers,
networks, devices, and user storage sources, among other
servers and databases housing content available for retrieval
and display on user devices. Network(s) 514 may be a WiFi
network and/or a cellular network. The OTA antenna 508
may also be configured to receive local broadcast signals
from local broadcast tower 512 or satellite broadcast tower.

Figure 6:
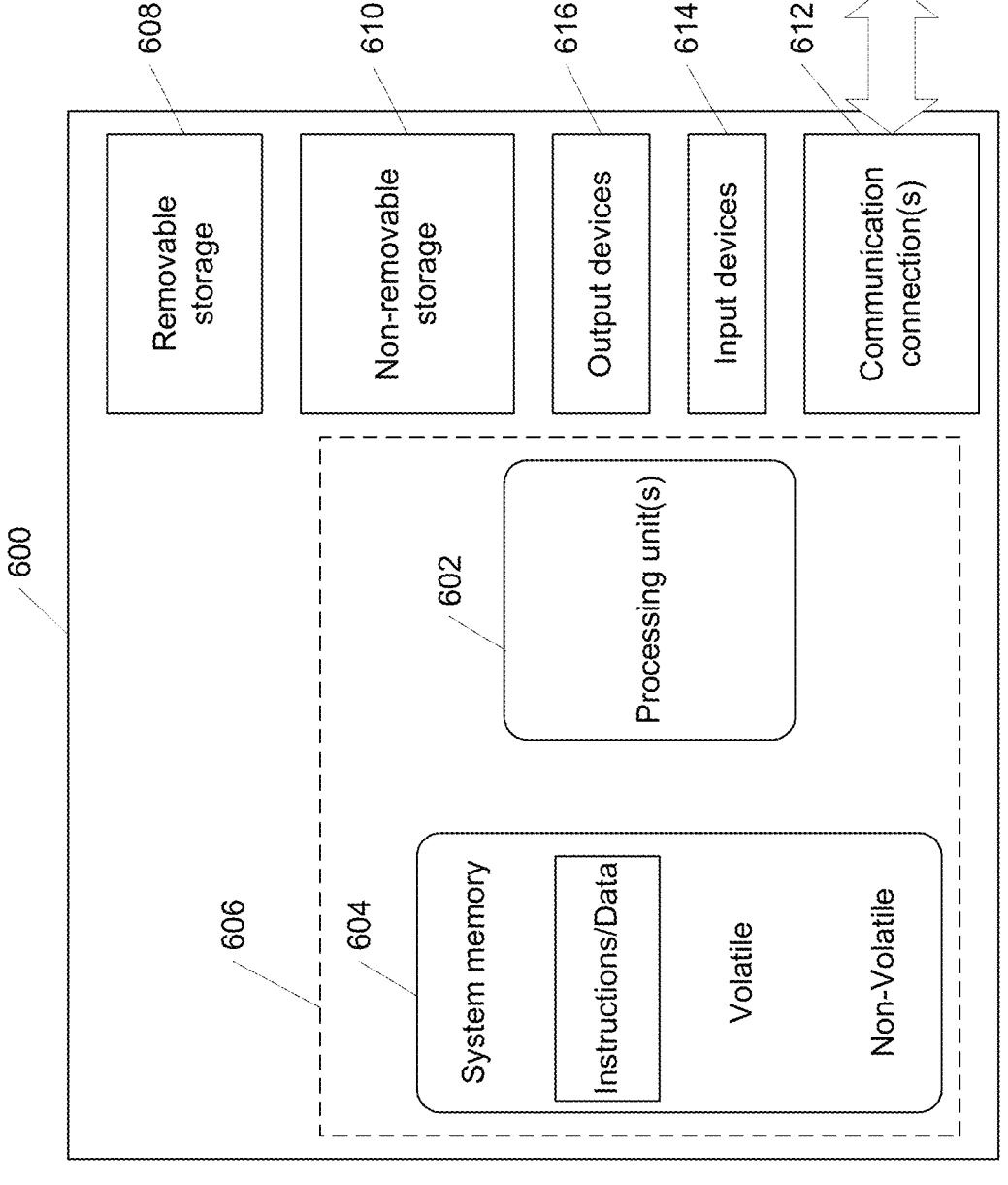
FIG. 6 illustrates one example of a suitable operating environment in which one or more of the present embodiments may be implemented.

FIG. 6 illustrates one example of a suitable operating
environment in which one or more of the present embodi-
ments may be implemented. This is only one example of a
suitable operating environment and is not intended to sug-
gest any limitation as to the scope of use or functionality.
Other well-known computing systems, environments, and/or
configurations that may be suitable for use include, but are not limited to, personal computers, server computers, hand-
held or laptop devices, multiprocessor systems, micropro-
cessor-based systems, programmable consumer electronics
such as smart phones, network PCs, minicomputers, main-
frame computers, distributed computing environments that
include any of the above systems or devices, and the like.

In its most basic configuration, operating environment
600 typically includes at least one processing unit 602 and
memory 604. Depending on the exact configuration and type
of computing device, memory 604 (storing, among other
things, information related to detected devices, compression
artifacts, association information, personal gateway settings,
and instruction to perform the methods disclosed herein)
may be volatile (such as RAM), non-volatile (such as ROM,
flash memory, etc.), or some combination of the two. This
most basic configuration is illustrated in FIG. 6 by dashed
line 606. Further, environment 600 may also include storage
devices (removable 608 and/or non-removable 610) includ-
ing, but not limited to, magnetic or optical disks or tape.
Similarly, environment 600 may also have input device(s)
614 such as keyboard, mouse, pen, voice input, etc., and/or
output device(s) 616 such as a display, speakers, printer, etc.
Also included in the environment may be one or more
communication connections, 612, such as Bluetooth, WiFi,
WiMax, LAN, WAN, point to point, etc.

Operating environment 600 typically includes at least
some form of computer readable media. Computer readable
media can be any available media that can be accessed by
processing unit 602 or other devices comprising the oper-
ating environment. By way of example, and not limitation,
computer readable media may comprise computer storage
media and communication media. Computer storage media
includes volatile and nonvolatile, removable and non-re-
movable media implemented in any method or technology
for storage of information such as computer readable
instructions, data structures, program modules or other data.
Computer storage media includes, RAM, ROM EEPROM,
flash memory or other memory technology, CD-ROM, digi-
tal versatile disks (DVD) or other optical storage, magnetic
cassettes, magnetic tape, magnetic disk storage, or other
magnetic storage devices, or any other tangible medium
which can be used to store the desired information. Com-
puter storage media does not include communication media.

Communication media embodies computer readable
instructions, data structures, program modules, or other data
in a modulated data signal such as a carrier wave or other
transport mechanism and includes any information delivery
media. The term "modulate data signal" means a signal that
has one or more of its characteristics set or changed in such
a manner as to encode information in the signal. By way of
example, and not limitation, communication media includes
wired media such as a wired network or direct-wired con-
nection, and wireless media such as acoustic, RF, infrared
and other wireless media. Combinations of any of the above
should also be included within the scope of computer
readable media.

The operating environment 600 may be a single computer
(e.g., mobile computer) operating in a networked environ-
ment using logical connections to one or more remote
computers. The remote computer may be a personal com-
puter, a server, a router, a network PC, a peer device, an OTA
antenna, a set-top box, or other common network node, and
typically includes many or all of the elements described
above as well as others not so mentioned. The logical
connections may include any method supported by available
communications media. Such networking environments are commonplace in offices, enterprise-wide computer networks, intranets, and the Internet.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of the claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and the alternate aspects falling within the spirit of the broader aspects of the general inventive concept embodied in this application that do not depart from the broader scope of the claimed disclosure.

From the foregoing, it will be appreciated that specific embodiments of the invention have been described herein for purposes of illustration, but that various modifications may be made without deviating from the scope of the invention. Accordingly, the invention is not limited except as by the appended claims.

What is claimed is:

1. A processor-implemented method comprising:
receiving a user request for a gateway device to allocate bandwidth of a network among a first device and a second device;
receiving a first user selection of a first number of customizable feature settings for the first device and a second user selection of a second number of customizable feature settings for the second device;
generating a priority order of allocating the bandwidth among the first device and the second device based on the first number of customizable feature settings being different than the second number of customizable feature settings; and
allocating the bandwidth of the network to the first device and the second device according to the priority order.

2. The processor-implemented method of claim 1, further comprising:
tracking network usage of the first device;
determining the first device has reached a threshold level of the network usage; and
in response to the network usage reaching the threshold level, transmitting a notification to the first device.

3. The processor-implemented method of claim 1, further comprising:
determining the first device has a greater number of customizable feature settings than the second device; and
adjusting the priority order of allocating the bandwidth among the first device and the second device based on the first device having the greater number of customizable feature settings than the second device.

4. The processor-implemented method of claim 1, further comprising:
determining the first device has reached a threshold level of network usage, wherein the network usage includes a bandwidth usage or a connection duration of the first device to the network; and
in response to the network usage reaching the threshold level, disconnecting the first device from the network.

5. The processor-implemented method of claim 1, wherein the priority order of allocating the bandwidth is determined by at least one machine-learning algorithm, wherein the at least one machine-learning algorithm is trained based on at least one dataset associated with a past priority order of allocating the bandwidth.

6. The processor-implemented method of claim 1, further comprising:
determining the first device and the second device are associated with customizable network connection settings; and
assigning priority value to the first device or the second device based the customizable network connection settings.

7. The processor-implemented method of claim 6, wherein the customizable network connection settings include an operational time setting, a media access control address tracking setting, or a network usage tracking setting.

8. A system comprising:
one or more processors; and
one or more memories storing instructions that, when executed by the one or more processors, cause the system to perform a process comprising:
receiving a user request for a gateway device to allocate bandwidth of a network among a first device and a second device;
receiving a first user selection of a first number of customizable feature settings for the first device and a second user selection of a second number of customizable feature settings for the second device;
generating a priority order of allocating the bandwidth among the first device and the second device based on the first number of customizable feature settings being different than the second number of customizable feature settings; and
allocating the bandwidth of the network to the first device and the second device according to the priority order.

9. The system of claim 8, wherein the process further comprises:
tracking network usage of the first device;
determining the first device has reached a threshold level of the network usage; and
in response to the network usage reaching the threshold level, transmitting a notification to the first device.

10. The system of claim 8, wherein the process further comprises:
determining the first device has a greater number of customizable feature settings than the second device; and
adjusting the priority order of allocating the bandwidth among the first device and the second device based on the first device having the greater number of customizable feature settings than the second device.

11. The system of claim 8, wherein the process further comprises:

determining the first device has reached a threshold level of network usage, wherein the network usage includes a bandwidth usage or a connection duration of the first device to the network; and in response to the network usage reaching the threshold level, disconnecting the first device from the network.

12. The system of claim 8, wherein the priority order of allocating the bandwidth is determined by at least one machine-learning algorithm, wherein the at least one machine-learning algorithm is trained based on at least one dataset associated with a past priority order of allocating the bandwidth.

13. The system of claim 8, wherein the process further comprises:

determining the first device and the second device are associated with customizable network connection settings; and assigning priority value to the first device or the second device based the customizable network connection settings.

14. The system of claim 13, wherein the customizable network connection settings include an operational time setting, a media access control address tracking setting, or a network usage tracking setting.

15. A non-transitory computer-readable medium storing instructions that, when executed by a computing system, cause the computing system to perform operations comprising:

receiving a user request for a gateway device to allocate bandwidth of a network among a first device and a second device;

receiving a first user selection of a first number of customizable feature settings for the first device and a second user selection of a second number of customizable feature settings for the second device;

generating a priority order of allocating the bandwidth among the first device and the second device based on the first number of customizable feature settings being different than the second number of customizable feature settings; and allocating the bandwidth of the network to the first device and the second device according to the priority order.

16. The non-transitory computer-readable medium of claim 15, wherein the operations further comprise:

tracking network usage of the first device;

determining the first device has reached a threshold level of the network usage; and in response to the network usage reaching the threshold level, transmitting a notification to the first device.

17. The non-transitory computer-readable medium of claim 15, wherein the operations further comprise:

determining the first device has a greater number of customizable feature settings than the second device; and adjusting the priority order of allocating the bandwidth among the first device and the second device based on the first device having the greater number of customizable feature settings than the second device.

18. The non-transitory computer-readable medium of claim 15, wherein the operations further comprise:

determining the first device has reached a threshold level of network usage, wherein the network usage includes a bandwidth usage or a connection duration of the first device to the network; and in response to the network usage reaching the threshold level, disconnecting the first device from the network.

19. The non-transitory computer-readable medium of claim 15, wherein the priority order of allocating the bandwidth is determined by at least one machine-learning algorithm, wherein the at least one machine-learning algorithm is trained based on at least one dataset associated with a past priority order of allocating the bandwidth.

20. The non-transitory computer-readable medium of claim 15, wherein the operations further comprise:

determining the first device and the second device are associated with customizable network connection settings; and assigning priority value to the first device or the second device based the customizable network connection settings, wherein the customizable network connection settings include an operational time setting, a media access control address tracking setting, or a network usage tracking setting.

* * * * *